(12) United States Patent
Deilmann et al.

(10) Patent No.: US 9,804,578 B2
(45) Date of Patent: Oct. 31, 2017

(54) USER STATUS- AND USER BEHAVIOR-BASED CONTROL SYSTEM AND METHOD FOR BUILDING TECHNOLOGY SYSTEMS AND COMPONENTS

(75) Inventors: Christian Deilmann, Munich (DE); Johannes Schwarz, Munich (DE)

(73) Assignee: tado GmbH, Munich (DE)

( * ) Notice: Subject to any disclaimer, the term of this patent is extended or adjusted under 35 U.S.C. 154(b) by 252 days.

(21) Appl. No.: 14/237,187

(22) PCT Filed: Aug. 7, 2012

(86) PCT No.: PCT/EP2012/065407
§ 371 (c)(1),
(2), (4) Date: Feb. 5, 2014

(87) PCT Pub. No.: WO2013/020970
PCT Pub. Date: Feb. 14, 2013

(65) Prior Publication Data
US 2014/0172176 A1   Jun. 19, 2014

(30) Foreign Application Priority Data

Aug. 8, 2011 (DE) .................. 10 2011 052 467

(51) Int. Cl.
 *G05B 15/02* (2006.01)
 *H04L 12/28* (2006.01)
 *H04L 29/08* (2006.01)

(52) U.S. Cl.
 CPC .......... *G05B 15/02* (2013.01); *H04L 12/2827* (2013.01); *H04L 67/125* (2013.01);
 (Continued)

(58) Field of Classification Search
 None
 See application file for complete search history.

(56) References Cited

U.S. PATENT DOCUMENTS

| | | | |
|---|---|---|---|
| 6,990,335 B1* | 1/2006 | Shamoon | G01D 21/00 455/410 |
| 2007/0152814 A1* | 7/2007 | Stefani | G08B 21/0269 340/539.22 |

(Continued)

FOREIGN PATENT DOCUMENTS

| | | |
|---|---|---|
| AT | 413059 B | 10/2005 |
| DE | 102009044161 A1 | 4/2010 |

(Continued)

OTHER PUBLICATIONS

International Preliminary Report on Patentability and Written Opinion; Mailed Feb. 11, 2014 for corresponding PCT Application No. PCT/EP2012/065407.

(Continued)

*Primary Examiner* — Tuan Dao
(74) *Attorney, Agent, or Firm* — Mendelsohn Dunleavy, P.C.; Steve Mendelsohn

(57) ABSTRACT

A building-installation control system comprises at least one interface unit for functional coupling to a building-installation functional unit, and a user status determination arrangement designed to determine a current building user status, wherein on the basis of the current building user status, a control specification for the building-installation function unit adapted thereto is then determined and used for controlling the operation of the building-installation function unit. The user status determination arrangement preferably comprises one or more of the following devices: a building user geodata acquisition device, an appliance usage sensing device, a radio frequency monitoring device and/or a power consumption sensing device that can be coupled to a smart meter.

16 Claims, 3 Drawing Sheets

(52) U.S. Cl.
CPC ............ *H04L 67/18* (2013.01); *Y02B 70/325* (2013.01); *Y04S 20/228* (2013.01)

(56) References Cited

U.S. PATENT DOCUMENTS

| | | |
|---|---|---|
| 2007/0233285 A1 | 10/2007 | Yamamoto |
| 2007/0262646 A1* | 11/2007 | Lee .................... H01R 13/6666 307/39 |
| 2008/0252141 A1* | 10/2008 | Horst ........................ H02J 3/14 307/35 |
| 2009/0054028 A1 | 2/2009 | Denning, Jr. et al. |
| 2009/0065596 A1* | 3/2009 | Seem .................... F24F 11/0009 236/51 |
| 2010/0161149 A1 | 6/2010 | Nguyen et al. |
| 2010/0286937 A1* | 11/2010 | Hedley ................. G06Q 30/02 702/60 |
| 2010/0289643 A1* | 11/2010 | Trundle ............... F24F 11/0086 340/545.1 |
| 2011/0046805 A1 | 2/2011 | Bedros et al. |
| 2011/0046904 A1* | 2/2011 | Souilmi ................. G01D 4/004 702/62 |
| 2011/0153107 A1 | 6/2011 | Kim et al. |
| 2011/0153525 A1* | 6/2011 | Benco ................... G06F 1/3203 705/412 |
| 2011/0309933 A1* | 12/2011 | Marino ................. G01S 5/0252 340/539.32 |
| 2012/0110739 A1* | 5/2012 | Rawls-Meehan .... A47C 20/041 5/616 |

FOREIGN PATENT DOCUMENTS

| | | |
|---|---|---|
| DE | 102009040090 A1 | 3/2011 |
| DE | 102009050170 A1 | 5/2011 |
| EP | 1115263 A1 | 7/2001 |
| EP | 2012468 A2 | 1/2009 |
| WO | WO0039964 A1 | 7/2000 |
| WO | WO2011065775 A2 | 6/2011 |
| WO | WO2013020970 A1 | 2/2013 |

OTHER PUBLICATIONS

Molina-Markham, A., et al. "Private Memoirs of a Smart Meter." Proceedings of the 2nd ACM workshop on embedded sensing systems for energy-efficiency in building. ACM, 2010, 6 pages.

Müller, Klaus J. "Ascertaining Behavior Profiles with a Smart Electricity Meter." DuD—Data Protection and Data Safety 34.6 (2010), pp. 359-364.

* cited by examiner

USER STATUS- AND USER BEHAVIOR-BASED CONTROL SYSTEM AND METHOD FOR BUILDING TECHNOLOGY SYSTEMS AND COMPONENTS

FIELD OF THE INVENTION

The present disclosure relates to a building technology control system, such as is used for example in the automation of buildings and/or in the control of energy generation, energy storage and energy conversion devices provided in a building. The present invention relates in particular to a building technology control system and a method for operation thereof, wherein a status or behavior of the building user is determined and is taken into consideration in the control of building technology components.

BACKGROUND OF THE INVENTION

The range of services covered by building technology control systems is always being extended to more services. Building technology control systems usually comprise climate control systems for heating and cooling tasks in buildings, the main focus being the regulation of a room temperature. Heating and cooling systems for buildings are generally also designated as HVAC systems ("Heating, Ventilating and Air Conditioning") or as HKL systems in German ("Heizung, Lüftung, Klimatechnik"). In so far as reference is made below to HVAC control systems or HKL control systems, these denote control systems for climate control heating and cooling tasks in buildings.

Further tasks for building technology control systems comprise for example the actuation of automatic sun protection measures, such as for instance roller blinds, as a function of the incident sunlight determined by means of a sensor system or the monitoring and control of the closing status of windows and doors.

In the context of this application "buildings" also encompass sections of buildings and any types of living environments, such as for example apartments or rooms.

In the prior art different systems are known which are intended for the remote control of equipment in a building, including inter alia the HVAC systems installed in a building. Thus for example a control system, which can be connected to the internet, for equipment in living environments can be obtained under the product designation "MAX!" via the online mail order firm "ELV Elektronik AG" from Leer in Germany. The system enables a user to control different equipment in a living environment via the internet. The system comprises an interface device (MAX! Cube) which is connected via an ethernet interface to a router present in the living environment. The router provides the interface device with a connection to the internet. Via this internet connection the interface device (MAX! Cube) is connected to an internet server system (MAX! Portal) which can be accessed by any internet-enabled terminals such as a computer or a smartphone. The access is generally made by means of an internet browser provided on the internet-enabled terminal. A plurality of devices, such as for example actuators or sensors, can be connected to the interface device (MAX! Cube) by means of a bidirectional wireless interface. In particular provision is made for remote-controlled motor-powered heater thermostatic valve actuators, window contact sensors and pickups to be connected by means of the wireless interface. By fitting compatible remote-controlled heater thermostatic valve actuators in different rooms the user is able to control the heating systems in the individual rooms in a targeted manner via a web interface. Thus the user can selectively switch on the heating in a first room and switch it off in a second room, without having to be at the particular location. Furthermore the interface device (MAX! Cube) is suitable for storage of all the configuration data and operating independently of an internet connection. The control operation is also possible without PC or internet.

Furthermore a house automation/home automation system and a method for automatic control of a domestic appliance on the basis of GPS data of a building user are known from US 2010/0127854. The GPS data of a building user, such as for instance the speed, and longitude and latitude information of the building user ascertained by means of a GPS device, are used by the home automation system in order to determine an estimated arrival time of the building user and, based thereon, to transmit a switching command to a domestic appliance.

US 2010/0161149 likewise describes a system in which an energy-consuming device is switched on the basis of the GPS data of a building user and an estimated arrival time of the building user calculated therefrom. Additional further factors are taken into consideration in the switching logic. In particular, previous performance of the energy-consuming device under different general conditions is taken into consideration, in order to achieve a situation where the energy-consuming device has already reached a steady operational state when the building user arrives. Thus for example, in order to take the inertia behavior of a heating system at different external temperatures into consideration, the heating can optionally be switched on earlier or later as a function of the external temperature and the knowledge of the earlier performance at this external temperature.

In order to achieve the respective control objective (also referred to herein as the "control specification"), the building technology control systems known from the prior art take into consideration a status of a building user in the past, but only insufficiently, and are therefore only suitable to a very limited extent for achieving a control of building technology components which is adapted to a status of a building user. Building user statuses within the context of this disclosure are for example "playing sport", "on the way", "at home", "working at desk", "sleeping", "watching tv" and "cooking". For example, in the systems known from the prior art it is not possible to establish whether a user is sleeping or playing sport and to derive from this a control specification of the building technology control system adapted to the respective status.

Furthermore, the systems known from the prior art do not take into consideration the fact that GPS data are not always available and also may be prone to error. As a rule the GPS data are collected via a mobile radio device or comparable portable device and transmitted to a building technology control system. For such a device to function properly the building user must carry it with him. It follows from this that the GPS data which are transmitted from the mobile telephone or from the portable device or which can be determined via the mobile communication network using a mobile radio cell number may be inaccurate. This is the case for example when a building user has forgotten his mobile telephone at a location or has deliberately not brought it with him, since for example he does not wish to be disturbed by telephone calls. Likewise, if a building user switches off his mobile telephone no GPS data are available.

A further limit to the control on the basis of GPS data is that it is not always possible to access GPS data of a building user, since for example for data protection reasons a building user may not want the GPS data of his mobile telephone to be made accessible either via his mobile communication network operator or via an interface provided on his mobile telephone.

SUMMARY OF THE INVENTION

In this context, therefore, the object of the invention is to provide a building technology control system and a method for operation thereof as well as a method for controlling a building technology component which determines a status of a building user and takes it into consideration in order to achieve the specific control objective for a building technology functional unit.

This objective is achieved by the features of claims 1 and 9 and modified by the measures of the subordinate claims 2 to 8 as well as claim 10.

Control of a building technology component adapted to a building user status leads to greater comfort for the building user and also a saving of power is achieved if a building technology component is operated only when it is actually required, and also only with the power which is actually required for the current building user status.

The control system according to the invention provides for a conclusion to be drawn from one single information source or a plurality of information sources, in order to use this for determination of a control specification for a building technology functional unit adapted to a current/present building user status.

For this purpose a building technology control system is proposed in which a user status determination means preferably comprises at least one or more of the following devices: a building user geodata sensing device, an appliance usage sensing device, a radio frequency monitoring device, a noise detection device, a light sensor device, a movement detection device and/or a power consumption sensing device which can be coupled to a so-called smart meter.

According to a preferred embodiment of the invention a current consumption detection device or current consumption measuring device for determination of a current building user status. Thus a conclusion may be reached, for example from the central current consumption of a building or a section of a building, with regard to a behavior or a status of the building user, since the current consumption has characteristic values or patterns depending an activity of a building user which is linked to the use of an electrical load in the building. Thus the current consumption of a television for example can be clearly distinguished from that of a washing machine or a refrigerator. Furthermore the current consumption has for example a particularly low value which is characteristic for the building or the section of the building when a building user is asleep, since then as a rule a minimal number of electrical loads are operating in the building or section of the building.

According to a further preferred embodiment of the invention, a building user geodata sensing device is used in order to determine, by comparison of a GPS data set of a building and a GPS data set of a building user, whether or not the building user is located within a defined geozone around the building. The information as to whether the building user is located in the defined geozone around the building is used by the building technology control system in order to control a building technology component in a targeted manner. Thus, using the example of a HVAC system, it is operated at a higher output when the building user is "at home", and when the building user is "absent", that is to say outside the geozone, at a lower output.

According to a further preferred embodiment of the invention the building technology control system is to be equipped with an appliance usage sensing device. An appliance usage sensing device is designed to be coupled to a signaling device in an appliance used by a building user, such as a computer, a sports device, a domestic appliance, or any other device. The appliance usage sensing device receives from the signaling device messages which contain information about the use of the appliance. Thus the building technology control system acquires information about the use of the appliance and can derive therefrom a control specification for a building technology component which is adapted to the behavior or the status of the building user.

According to a further preferred embodiment of the invention the building technology control system is to be equipped with a radio frequency monitoring device. A radio frequency monitoring device monitors radio frequency bands for specific characteristics which are detectable in the power spectrum of the radio frequency bands. If specific characteristics are recognized, the radio frequency monitoring device signals this to the user status determination device. As a rule a conclusion can be drawn from the detection of the characteristics as to the presence of a building user in the building and a suitable control specification for a building technology functional unit can be derived on the basis of this conclusion.

According to a modification of the control system according to the invention a statistical evaluation of user statuses of a building user determined in the past is carried out and from this a user behavior time profile is derived which is typical for the building user and which is used exclusively or in co-ordination with a currently determined user status for controlling the operation of the building technology functional unit. Such a user behavior time profile is advantageous particularly when the currently or presently determined user statuses may be prone to error, as was described in the introduction using the example of acquisition of the GPS data of a building user.

According to an embodiment of the invention, in connection with building-based energy generation, energy-generating building components, such as for example a combined heat and power unit, photovoltaic plants, solar thermal power plants, heat pumps, biogas plants, wind and water power plants, can be controlled on the basis of a building user status. Thus associated energy accumulators can be charged or discharged depending upon the building user behavior. Thus for example in the absence of a building user an energy accumulator located in the building can be discharged in order to provide energy by means of a supply network, such as for example a power supply system, to other parties connected to the supply network, such as for instance households. In the presence of the building user, on the other hand, no discharge or only a reduced discharge of the energy accumulator takes place, since the energy might be required by the building user himself. In a multi-user scenario, in which a plurality of building users are associated with a building or a section of a building, it is also conceivable to make the degree of discharge of the energy accumulator dependent upon the number of building users present. Using the example of a two-person household, the energy requirement of the household when both persons are present is of course higher than when only one person is present. Possible energy accumulator include, without limitation to the examples given, accumulators, heat storage systems, pump storage systems and flywheel systems.

Consequently building technology systems within the context of the present invention may in particular also comprise control systems for energy generation devices, energy storage devices and energy conversion devices, such as are used in particular in buildings which are equipped with systems for using renewable/regenerative energy. Examples of systems for using renewable/regenerative energy comprise, without limitation to those mentioned here, photovoltaic plants, solar thermal power plants, wind power plants, hydropower plants, geothermal and bioenergy plants as well as energy storage devices and energy conversion devices connected thereto.

In particular, a battery or an accumulator of an electric vehicle, such as for instance an electric car, may also be considered as an energy storage device. A building user status ascertained by the building technology control system according to the invention may be used to charge or discharge the energy storage device of the electric vehicle depending upon the building user status. Thus for example in the absence of the building user(s) energy can be taken from the energy accumulator of the electric vehicle and can be returned when the return of the building user to the building is imminent.

In particular the invention encompasses a building technology control system, in which the building technology functional unit is a heating or cooling system, a heat exchanger, a heater, a heater thermostatic valve, a hot water supply system, a fan, an air-conditioning device, a smart glass (electrochromic glass/controllable daylight system), of which the transparency to light can be changed by the application of an electrical voltage, a domestic appliance or another energy-consuming appliance.

The invention also encompasses a method for operating a building technology control system and/or for controlling a building technology functional unit, wherein the method comprises the following steps: Determining a current building user status and using the determined building user status for determination of a control specification for a building technology functional unit, wherein the building technology functional unit controls a physical variable of the building, the control behavior of which exhibits an inertia which is manifested by a delay in reaching a specified status in response to a switching command, furthermore with the step of ascertaining a building user status to be expected from statistical data and/or details of a building user; wherein the use of the determined building user status also includes balancing the expected building user status with the determined building user status.

According to a further aspect, a building technology control system is disclosed, in particular for HVAC systems, wherein an internet weather data interface is provided in order to take weather data and weather forecasts from the internet into consideration for controlling the operation of the building technology functional unit.

According to another further aspect, a building technology control system is disclosed, in which the building technology control system comprises a retrofit unit for a central heating thermostat which can be coupled to a heating thermostat installed in a building, wherein the retrofit unit comprises a changeover unit which can change over between a first mode of operation and a second mode of operation. The first mode of operation comprises controlling the heating system by the retrofit unit. The second mode of operation comprises controlling the heating system by the originally installed heating thermostat. The retrofit unit can preferably be coupled to a central unit, by means of which the control commands can be transmitted to the retrofit unit and messages from the retrofit unit can be received. According to a preferred embodiment of the coupling of the retrofit unit to the originally provided heating thermostat, control specifications and/or statuses of the original heating thermostat can be recorded or sensed by the retrofit unit.

According to another further aspect, a building technology control system is disclosed, in which energy is supplied via the heating pipes installed in a building. It comprises an energy supply device which can be coupled to a heating pipe system can be coupled and is designed to introduce an amount of energy in the form of a high-frequency signal into the pipe system, wherein the pipe system functions as a single conductor. Furthermore, the building technology control system preferably comprises at least one building technology component in the form of an electrical heater thermostat actuator which can be connected to the pipe system and is designed to convert the electrical energy introduced from the energy supply device into the pipe system back into electrical energy. The advantage of this embodiment in connection with a building technology control system for a heating system is based on the fact that no additional electrical conductor has to be laid to the individual heaters, no battery change is necessary and expensive energy harvester modules can be omitted.

BRIEF DESCRIPTION OF THE DRAWINGS

The invention is explained in greater detail below with reference to the drawings. In the drawings.

DESCRIPTION OF THE DRAWINGS

Figure 1:
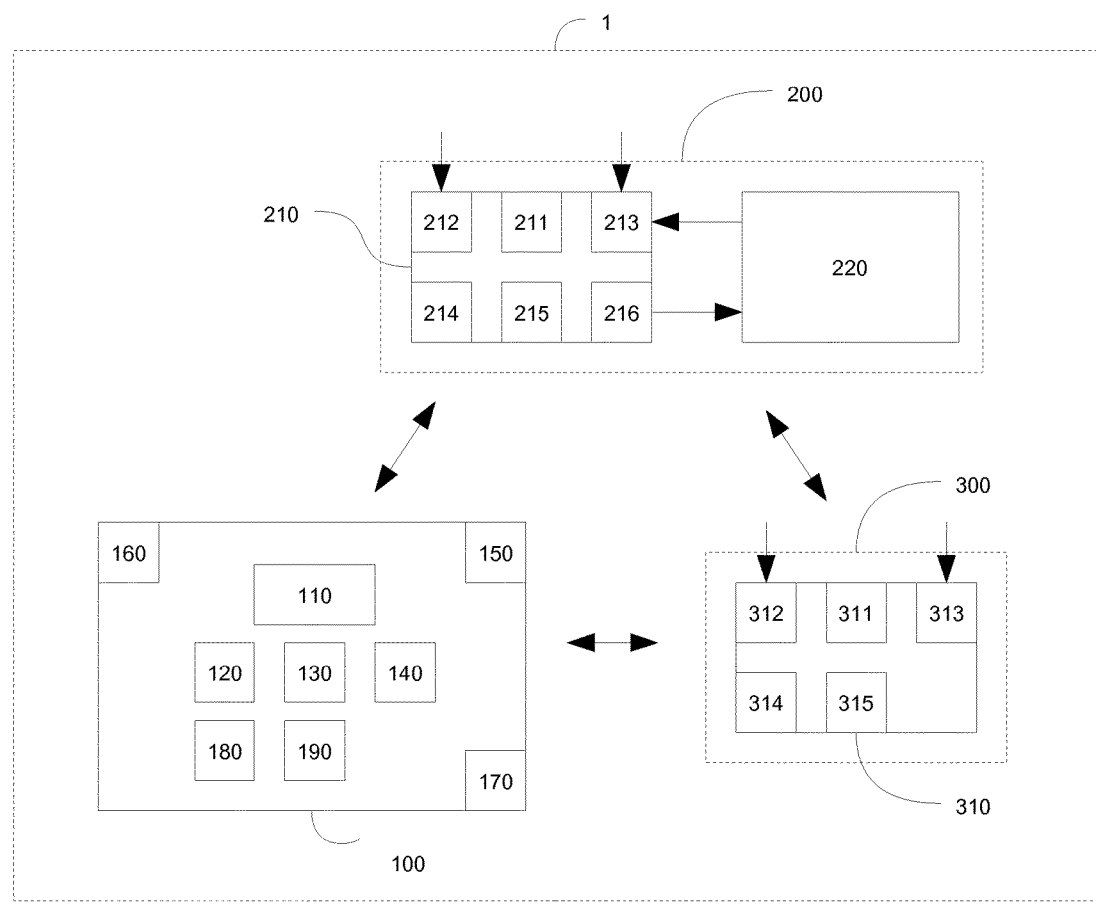
FIG. 1 shows a schematic system overview of the building technology control system according to the invention, from which the essential devices of the system can be seen.

FIG. 1 shows by way of example a possible embodiment of a building technology control system 1 according to the invention as a schematically system overview. It has a central unit 100 and at least one building technology component 200, wherein the building technology component 200 comprises a distributed interface unit 210 which is designed to co-operate functionally with a building technology functional unit 220, such as for example a space heater or an energy accumulator.

In order to be able to co-operate with the building technology functional unit 220, the distributed interface unit 210 has at least one actuator 216 which is designed to act on the building technology functional unit and to trigger an action there.

Different actuators are employed depending upon the design of the building technology functional unit 220 coupled to the actuator 216. The type of actuator is of subordinate significance for the idea underlying the invention and depends principally upon the building technology functional unit 220, that is to say that in the simplest case the actuator may be a simple relay, an optocoupler or another switching device known to the relevant person skilled in the art, such as is required for example for controlling an electrical sun protection system. On the other hand, if the building technology functional unit is a heater, then the actuator 216 can effect opening and closing of a heater thermostatic valve. However, the above examples only constitute a small excerpt from the diverse possibilities for the coupling of actuators to building technology functional unit.

In many cases, for successful co-operation of the distributed interface unit 210 with the building technology functional unit 220, a sensor 213 is advantageously provided which can supply information about a status of the building technology component 200 or of the building technology functional unit 220. Using the example of an electrical sun protection system, such a sensor could for example sense information about a degree of coverage of the sun protection system. Accordingly, in a heater thermostatic valve actuator the sensor 213 could sense a closing status of the heater thermostatic valve and could provide this to the distributed interface unit as an information signal.

In the same way, however, the sensor 213 of the distributed interface unit 210 may also be a sensor which detects any other measurement variables which are not in a direct functional relationship with the building technology functional unit but are nevertheless relevant for the control system. Thus the sensor 213 can for example sense the following physical variables: Interior temperature, interior humidity, relative humidity, absolute humidity, IR heat sources, smoke, lighting in a room, closing status of windows or doors, locking status from window or doors, presence of persons in the room, sunlight, external temperature, status of a glass surface, integrity of a glass surface.

All these variables can be converted into an electrical signal by means of physical effects. Devices which generate an electrical signal from the above-mentioned parameters, are known for example as photoelectric transducers, thermoelectric transducers, pyroelectric transducers or magnetoelectric transducers and are combined under the title of sensor.

Sensors can also detect the status of mechanical, electromechanical and electrical command transmitters and/or comparable systems.

However, the distributed interface unit may also comprise a plurality of sensors 213, of which one or more are in a direct functional relationship with the building technology functional unit and detect one or more further measurement variables which in the described sense are not in a direct relationship with the building technology functional unit.

Furthermore, for signal processing the distributed interface unit 210 comprises a processor device 211 which is designed to transmit at least one control signal to the actuator 216 and to process a sensor signal of the sensor 213. The processor device 211 can perform analogue or also digital processing of the incoming signals of the sensor 213. Preferably digital processing of the incoming signals takes place. Furthermore, the processor device preferably comprises an analog-digital converter, which can also convert analogue signals from an analogue sensor into a digital signal. Alternatively, can also the sensor already a analog-digital converter encompass and one digital signal than output signal supply.

Furthermore, a communication device 214 is connected to the processor device 211 of the distributed interface unit 210. The communication device 214 comprises a message transmitting and receiving device which for data exchange can be connected both in a wired and also a wireless manner to a communication device 150 of the central unit 100. A data exchange can take place for example by means of an internet connection. Typical transmission techniques comprise, but are not limited to, WLAN and Ethernet connections. In particular connections are also possible by means of mobile wireless systems, such as for instance GSM/GPRS, UMTS/3G, LTE/4G or comparable mobile wireless systems.

The TCP/IP protocol can be used as a suitable transmission protocol. In the same way wireless communication technologies such as Z-Wave, ZigBee, Bluetooth, 6LowPan, wireless M-bus and/or EnO-cean can be used.

For operation of the different device of the distributed interface unit 210, such as for example the processor device 211 or the communication device 210, as well as the sensor 213 and actuator 216, a power supply device 212 is necessary. Such a power supply device can be designed for example as a network supported power supply, for example the distributed interface is then optionally also connected by means of a network part to the power supply system of the building and is supplied with power thereby. A network supported power supply may also be provided by means of the Power-Over-Ethernet technology (PoE technology), in which the power supply takes place by means of a LAN or Ethernet cable which also provides a communication connection.

Furthermore the power supply device 212 of the distributed interface 210 may also be designed as a network-independent power supply, for which purpose an electrical energy accumulator and/or an energy converter is to be provided. Possible energy accumulators encompass electrochemical energy accumulators, such as for instance batteries and accumulators, or charge storage devices, which function according to the capacitor principle. In the case of a network-independent power supply such an energy accumulator is preferably to be coupled to an energy converter, which converts non-electrical ambient energy, such as light, heat, motion, electromagnetic waves and other ambient energy, into electrical energy. Typical examples encompass photovoltaic cells and thermoelectric elements. The electrical energy obtained can be transmitted from the energy converter to an energy accumulator, in order to transmit it if need be to the electrical consumer units, i.e. devices, of the distributed interface 210.

Optionally the distributed interface unit 210 additionally comprises a user interface 213 which is coupled to the processor device 211 and which can preferably be designed as a touch screen or capacitive touch pad but also as a simple pickup and/or LED.

The building technology component 200 comprises a distributed interface unit 210 and a building technology functional unit 220. This should make it clear that integrated solutions are also conceivable in which the distributed interface does not appear as a separate functional unit and constitutes an integral component of the building technology component 200.

For illustration of a possible alternative use of a distributed interface unit of the control system according to the invention, the building technology control system 1 of FIG. 1 further comprises a sensor component 300. The sensor component 300 comprises a distributed interface unit 310, which substantially comprises the same devices/functional units as the distributed interface unit 210 of the building component 200. Thus it comprises a processor device 311, a power supply device 312 and a communication device 314, such as were previously described in connection with the distributed interface unit 210.

Furthermore the distributed interface unit 310 also comprises a sensor 313 and/or a user interface 315. A sensor 313 forms an information source which provides the building technology control system 1 with physical measurement variables and which is not in a direct functional relationship with a building technology functional unit in the sense described above. Thus for example a temperature sensor can supply information about a room temperature. A user interface 315 can be provided in addition or also independently of a sensor 313. The user interface 315 provides a building user with a possibility of acting on the building technology control system 1. Thus for example the actuation of a pickup can be transmitted to the building technology control system 1 by the communication device 314.

Furthermore the building technology control system 1 has a central unit 100 which has a processor device 110 and a communication device 150 coupled thereto.

The communication device 150 of the central unit 100 is suitable for communicating with the communication device 214, 314 of the distributed interface units 210, 310 in order to exchange data and instructions. The communication device 150 of the central unit 100 is connected to the communication device 214, 314 of the interface units 210, 310 in order to receive data and instructions from and send data and instructions to the interface units 210, 310. A unidirectional or bidirectional communication data exchange can take place between the distributed interface units 210, 310. At the same time the communication can take place between the central unit 100 both directly with a distributed interface unit 210, 310 and also via the communication device 214, 314 of one or more further distributed interface units 210, 310 which takes on a forwarding function in the context of the communication connection. Thus for example the communication connection between the central unit 100 and the distributed interface units 210, 310 can be formed as a wired or wireless mesh network. According to a preferred embodiment the distributed interface units 210 are combined into a self-organizing network which reorganizes itself in the event of failures of individual units.

Furthermore the central unit 100 can have an internet data interface 130 by means of which internet data, such as for instance weather data including temperatures, sunlight and weather forecasts, are provided to the central unit 100. Conventional methods for accessing internet data comprise HTTP requests and can for example use the REST protocol. Alternative protocols comprise XML-RPC as well as the SOAP protocol. In the same way can the internet data interface can also provide data which internet computers can access.

Furthermore the central unit 100 comprises a user status determination device 120, which may comprise one or more of the following devices: a building user geodata sensing device, an appliance usage sensing device, a radio frequency monitoring device and a power consumption sensing device.

A building user geodata sensing device ascertains GPS data of one or more building users, which are used by the control system according to the invention for controlling a building component, wherein the GPS data of one or more building user(s) determine the status to which the building component is set. Typical GPS data comprise a position indication by longitude and latitude. GPS data preferably also comprise a direction and/or speed of movement at which a building user is just moving. Usually for this purpose a building user must carry a device with him which is designed to ascertain such GPS data and to transmit it to the central unit 1. The transmission of the GPS data preferably takes place initially to a central internet server which holds these data for retrieval. From this internet server the GPS data can then be retrieved via an internet interface 130 by the central unit 100. Current mobile telephones are typically equipped as standard with a device which is suitable for sensing the GPS data of the mobile telephone owner. By means of a software application which is executed on the mobile telephone the data is then transmitted to a central internet server. Under the product designation Google Latitude, Google provides a software package which can be installed on the most varied mobile telephones and is designed to transmit the GPS data of the mobile telephone owner to an internet server. The internet server provides an interface by means of which the GPS data of a Google Latitude user can then be read. Thus the internet interface 130 can provide the GPS data of a building user to the user status determination device 120 of the central unit 100.

An appliance usage sensing device is designed to detect the use of specific appliances used in households, such as for example the use of a computer or a television set or a training device. Thus for example a bicycle home trainer can be equipped with a device which notifies the appliance usage sensing device when a building user is just training on the bicycle home trainer. In the same way television sets or computers can also have devices which report use of the corresponding appliance to the appliance usage sensing device.

In the case of a computer such a signaling device can be designed as software for example as a so-called browser plugin or as a so-called tray application. The computer then continuously notifies the appliance usage sensing device that a user is just using his computer and the temperature in the building or room must be raised slightly for a non-physical activity, in order to prevent a cooling down of the building user before the computer. Cooling down of a building user is generally a problem if the building user(s) perform activities which are characterized by considerable physical inactivity.

The user status determination device 120 can also comprise a radio frequency monitoring device which monitors the radio frequency bands for specific characteristics. Usually nowadays almost every building user uses a mobile telephone. If the building user stays in the building or section of the building, in the building a specific radio frequency emission which is characteristic for a mobile telephone can be measured by monitoring the corresponding radio frequency bands for mobile communication applications. If such characteristic features are ascertained in the radio frequency monitoring, a conclusion can be drawn that a building user is located in the building and the radio frequency monitoring device notifies this to the user status determination device 120.

Similarly the radio frequency monitoring device can monitor the frequency bands for WiFi/wireless LAN and/or Bluetooth. If an activity can be ascertained in these frequency bands, it may be assumed that a building user is just using a personal computer. Personal computers and in particular portable computers, such as also tablets and mobile telephones, are frequently connected via WiFi connections to the internet. Frequently wireless keyboards are also connected to a computer via Bluetooth. Thus a measurable activity in the Bluetooth radio frequencies can also indicate computer use. Thus the radio frequency monitoring device can be used by the building technology control system according to the invention in order to derive a suitable control specification for a building technology functional unit.

Furthermore the user status determination device 120 can also comprise a power consumption sensing device. The power consumption sensing device can be designed as a so-called smart meter, or can be coupled to such a meter. Likewise it is also possible to obtain the power consumption data from a so-called data warehouse of a power supplier. Such a data warehouse provides the power consumption data of a user by means of an internet interface, so that the central unit 100 can also obtain such power consumption data of a building user by means of the internet interface 130. The user status determination device 120 can draw a conclusion as to a user status from the power consumption data.

Within the overall building technology system the central unit 100 takes over the evaluation and processing of all sensor data, in order to derive therefrom control commands for the different distributed interface units 210, 310. The central unit 100 can be designed as an internet server or as a unit to be installed in the building.

For this purpose the central unit 100 preferably comprises a data storage device 140, in order to store the data detected over the different devices of the central unit 100. For example the data storage device 140 stores data transmitted from the distributed interfaces 210, 310. Furthermore, data obtained via the internet data interface 130 can be stored in order to process the data via the processor device 110 or a statistical evaluation device 180. The statistical evaluation device can also be designed as a program logic in the processor device 110.

The processor device 110 or the statistical evaluation device 180 can preferably co-operate with a user profile storage and management device, so that specific control specifications and wishes of the building user which are stored in user profiles can be included in the control logic. The statistical evaluation device 180 is designed to determine, from user behavior determined in the past by the user status determination device, a typical behavior profile of a building user or of a plurality of building users which is used subsequently for the determination of control specifications.

The central unit 100 receives data from the distributed interface units 210, 310, so that various data sources are running together in the central unit. These data sources are evaluated and processed for calculation/determination of suitable control or regulating signals or specifications. In this case, current data as well as historical data but also predictions based on statistical methods are used in order always to give the best possible control signal on a stochastic basis. It is provided that as a result the control system according to the invention over time achieves ever better regulation of the building technology system, since with time it can interpret the building user's habits better and can for example interpret signals which contain errors as incorrect.

Furthermore the central unit 100 requires a power supply device 160. The different possibilities for implementation of a power supply device 160 have already been described in detail with regard to the distributed interface units 210, 310.

The central unit can have a user interface 170 in order to a provide a user with a possible means of making adjustments to the building technology control system and displaying reports on the previous operation of the system. The user interface 170 is preferably designed as an internet portal and/or as a smartphone application which a user can access via a web browser or comparable network-compatible software applications. Furthermore the user interface 170 can have a display unit in combination with an input device. A suitable display unit with an integrated display unit is a touch screen.

Figure 2:
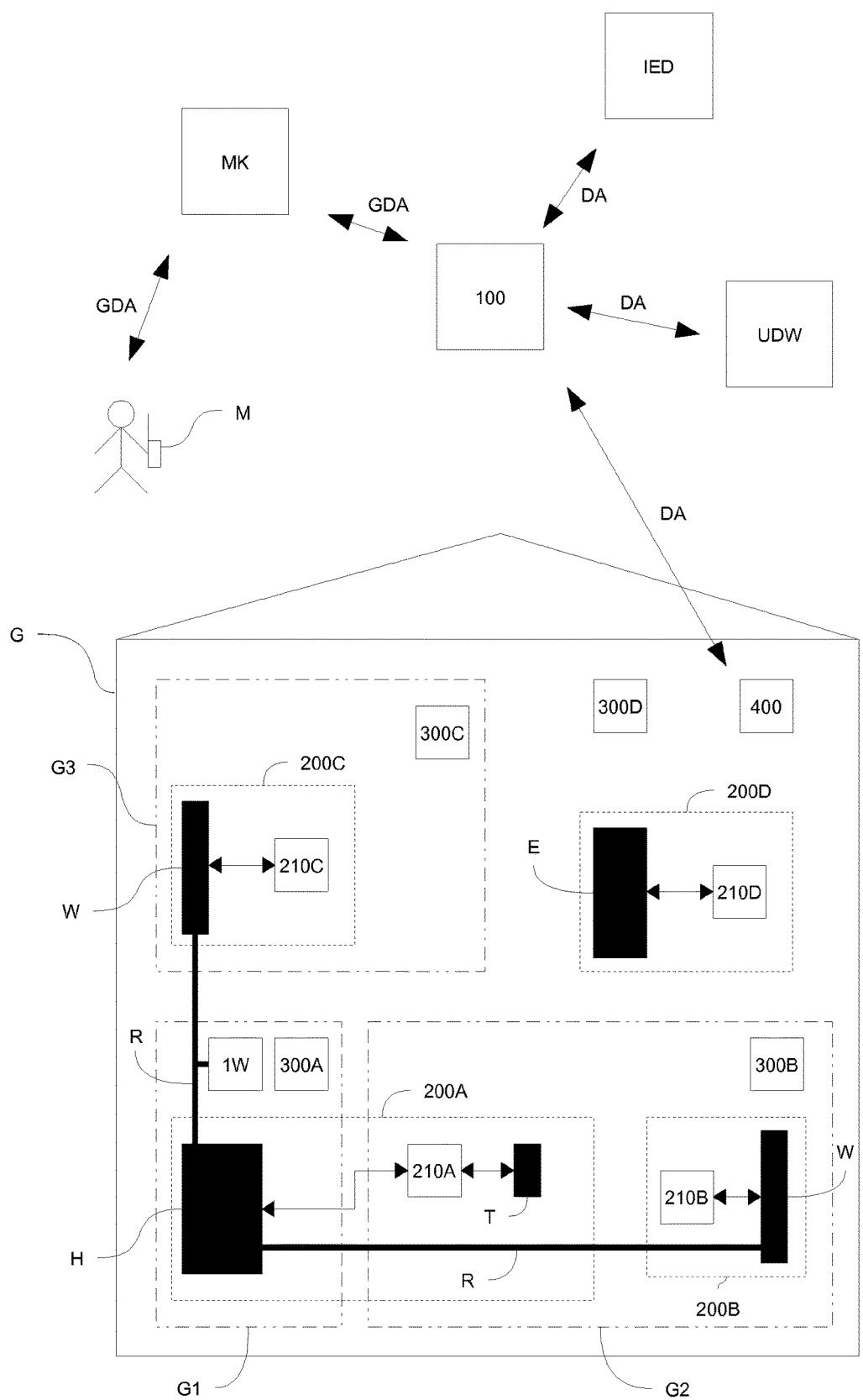
FIG. 2 shows a preferred embodiment of the building technology control system according to the invention, in which the building technology control system is coupled by way of example to a HVAC system of a building.

FIG. 2 shows a preferred embodiment of the building technology control system according to the invention, in which the building technology control system is coupled by way of example to a HVAC system of a building;

HVAC control systems are used in the control of heating and cooling systems in buildings. As a rule HVAC systems are regulated by decentralized thermostats on heaters and/or by a central thermostat for controlling the power output of the HVAC appliance. In most cases the central control unit of the HVAC appliance predetermines the reference value and additional decentralized thermostats take on the function of individual refinement of the performance specification for certain room sections.

HVAC systems have the characteristic of a certain inertia. This means that a lead time is necessary in order to achieve a desired room climate. This is a fundamental difference from, for example, room lighting, which can be adjusted to the desired setting immediately with a switch.

In order that HVAC systems do not run at full power for 24 hours a day, 7 days a week, regardless of the room use, newer regulators offer the possibility of timer programming as a function of the day by a user interface on the regulator itself. Thus users can adapt the heating or cooling performance to their individual wishes. This is adjusted for example so that a drop in temperature at night and during the working day a reduction in performance during the working time outside the house are taken into consideration. These drops in performance serve for saving energy.

Experience shows that the described programming of the HVAC control systems is less user-friendly, very time-consuming and in most cases insufficient with regard to the optimization and comfort of the air conditioning in the building. For this reason most HVAC control systems are not optimized or very poorly optimized with regard to the room usage. It may be mentioned for example that usage times vary and often cannot be predicted precisely in the programming. The result of this is that when usage deviates from the programming either energy is wasted or the room climate does not offer the desired comfort.

FIG. 2 shows clearly the connection of the building technology control system according to the invention to a HVAC system provided in a building G and the sections of the building G1, G2, G3. The illustrated HVAC system comprises a central energy conversion device H and one or more decentralized heat exchangers W which are disposed in various rooms or building sections G2, G3 of the building G. If the HVAC system is a heating system, a burner of such a heating system would constitute an energy conversion device within the meaning of this description. Similarly in an air conditioning system the compressor unit forms an energy conversion device within the meaning of this description. In a heating system the burner serves to heat a heat transfer medium in the heating system through the combustion of a fuel or by conversion of electrical power. The heat transfer medium is then conveyed through the HVAC system, wherein it gives off its heat via distributed heat exchangers to the ambient air in rooms in the building and thus heats the rooms. Similarly, in an air conditioning system for the ambient air in the rooms, heat energy is removed by the heat transfer medium heating and discharged by the energy conversion device H generally to an external environment.

FIG. 2 shows in the building sections G1 and G2 a building technology component 200A which comprises a distributed interface unit 210A which is coupled to the energy conversion device H of the HVAC system of the building G. The control system according to the invention is directly connected to the energy conversion device H and can act on it for regulation or control. The necessary connection between the distributed interface unit 210A and the HVAC system can take place in a wireless and/or wired manner. For example, in a heating system the distributed interface unit 210A can switch the burner on or off as required. Consequently within the building G or the building sections G1, G2 the distributed interface unit 210A forms a local unit which is designed to establish a data link to the remote central unit 100 and to exchange data.

The distributed interface unit 210A has the devices described with respect to the FIG. 1, and these are not detailed explicitly here in order to avoid repetitions. Thus a communication device or message transmitting and receiving device for data exchange with the further distributed interface units 210B-D and/or the central unit 100 are provided. The distributed interface units 210 preferably communicate with one another wirelessly and, if necessary in order to bridge greater distances with low transmission power, can form a mesh network.

A remote computer server, such as for instance an internet server, preferably forms the central unit 100 of the building technology control system according to the invention. Consequently the data exchange between the interface units 210 and/or the central unit 100 can take place for example by means of an internet connection. A gateway device 400 is usually necessary, such as for example a bridge or a router, in order to mediate between a method of communication used within the building and a method of communication which is suitable for connection to the internet. Typical methods of communication and transmission techniques for connection to the internet comprise, but are not limited to, ISDN, DSL, cable DSL, WAN, LAN, WLAN and Ethernet connections. In particular connections are also possible by means of mobile wireless systems, such as for instance GSM/GPRS, UMTS/3G, LTE/4G or similar wireless systems.

The distributed interface unit 210A is preferably configured for connection to an energy conversion device H as a retrofit solution which can be coupled to a regulating or control unit T, such as for instance a heating thermostat provided by a heating system manufacturer, already existing in the building G or a building section G1, G2, such as for instance as apartment. In normal operation the distributed interface unit 210A of the control system according to the invention takes on the control or regulation of the HVAC system. Control and regulating specifications of the present or originally installed regulating/control unit T are not connected through. Alternatively in normal operation of the building technology control system the present or originally installed regulating/control unit T can also partially or completely deactivate the originally installed regulating/control unit T.

By a coupling of the distributed interface unit 210A to the already installed/present regulating or control unit T a failsafe operation of the HVAC system can be ensured, since in the event of a failure or a malfunction of the distributed interface unit 210A the originally installed system can be accessed by switching over. Such access can be achieved for example by switching through of the signals of the originally installed regulating or control unit or reactivation of the originally installed regulating or control unit T.

The described fail-safe operation of the control system according to the invention can be implemented by a changeover unit which is not shown in the drawings. The changeover unit is designed for switching to the conventional regulating unit or the thermostat T. This function can for example be performed technically by a transfer relay.

In this case the mode of functioning of the changeover unit is in no way limited to purely fail-safe operation. The solution is preferably designed so that, by means of a signal from the central unit 100 or also from a pickup on the measuring and regulating unit 10 itself, if need be the current flow as well as the signals can bypass the distributed interface unit 210A as if the distributed interface unit 210A of the control system according to the invention were not present. In other words, in the event of such bypassing, the conventional or originally already existing or installed regulating unit T takes on the control of the HVAC system. If no such bypassing takes place, the distributed interface unit 210A or the central unit 100 of the control system according to the invention takes control. This switch-over facility offers the advantage that in response to a user's wishes, a system disruption or a system failure of the control system according to the invention it is possible to switch over to the original control/the original regulating unit T belonging to the installed HVAC system According to a preferred embodiment of the coupling of the distributed interface unit 210A to the original or present control/regulating unit T, the signals and/or statuses of the original or present control/regulating unit T are read or detected. This reading of the signals and/or statuses can take place both when the distributed interface unit 210A of the control system 1 according to the invention has control over the HVAC system and also when the present or original control/regulating unit T actively regulates the HVAC system and the distributed interface unit 210A is bridged or switched off. By detection of the regulating/control specifications of the original or present control/regulating unit T it is possible to carry out comparisons of the regulation performance or of the regulation success of the two units. Thus for example it is possible to ascertain whether there are savings in relation to the energy consumption which are achieved by the use of the control system according to the invention, and if so how high these savings are. In particular it is possible to ascertain what energy consumption would be caused by T while the distributed interface unit 210A of the control system according to the invention controls the HVAC system controlled.

By reading or monitoring and detecting the signals and/or statuses of the original regulating unit T during a time period such as for example one week, during which the distributed interface unit 210a did not control the HVAC system, temperature and time switch programming of the original a regulating unit T can be reconstructed from the switch commands sent by the original regulating unit T without it being necessary to know the programming of the original regulating unit T.

Consequently the described comparison of the regulation performance or regulation success of the two units may be based on the comparison between the reconstructed programming of the original regulating unit and the regulating behavior of the distributed interface unit 210A.

Although in FIG. 2 it is not explicitly illustrated again, the distributed interface unit 210A for requires a power supply for operation. Commercially available power supply units, Power-Over-Ethernet or other solutions known to the person skilled in the art can be employed as power supply. In the case of a retrofit solution, however, use or shared use of the power supply of the originally installed regulating or control unit T may in particular also be considered, so that a separate power supply can be omitted. The power supply usually takes place by means of connecting lines which connect the energy conversion device H to the thermostat T. Therefore a voltage conversion device which ensures a power supply necessary for the operation of the distributed interface unit 210A is preferably provided in the distributed interface unit 210A.

By means of an internet-enabled device IED, such as for example an internet PC, a smartphone (mobile telephone) or a tablet computer, a user interface of the central unit of the control system according to the invention displays system statuses and historical data of the control system and makes it possible to change adjustment settings of the control system.

FIG. 2 shows a possibility for acquisition of the GPS data of one or more building users, wherein the location of the geoposition of a building user takes place with the aid of a mobile telephone M which the building user carries with him. A locating process for determining a geoposition as well as further GPS data, such as a direction of movement or speed, can take place by means of a GPS module in the mobile communication device and/or by determination of an identifier or a plurality of identifiers of mobile communication cells in which the mobile telephone is located or is moving. The cell data are available in the core network KM of a mobile communication provider and can be provided by the mobile communication provider/network operator to the central unit 100 of the control system according to the invention. Methods for mobile telephone location comprise determination of a cell ID or position finding by triangulation from which a conclusion be drawn as to a position and/or speed.

In the control system according to the invention one or more geographical boundaries (geozones) can be defined or stored. If the user moves towards the building, the HVAC system is set to a required room temperature. If the user moves away from the building the HVAC system is set to the defined energy saving mode. The regulation can take place in one or more stages can take place by means of one or more geographical boundaries.

An advantageous embodiment of the control system according to the invention provides a process for locating the building user and a control algorithm coupled thereto which takes account of the preferences with regard to a different building user's desired temperature of the building. For example resident A prefers the room temperature X° and resident B prefers the temperature Y°. Accordingly when resident A is present the control system adjusts the temperature to X° when resident B is present it adjusts the temperature to Y°. If both A and B are present, in the system a further temperature can be specified or the higher of the two temperatures can be used.

The information about a geoposition of a building user can make it possible when controlling the HVAC system to take into consideration a lead time which the HVAC system requires in order to heat the building G or the building sections G1-3 to a predetermined temperature.

Because numerous data sources (distributed interface units) are combined in the central unit 100 of the control system according to the invention, it is possible over time to detect the characteristics of the HVAC system and of the building under various boundary conditions, such as for instance under different weather conditions, and to utilize control specifications of the control system according to the invention. Thus a better result with regard to the room climate can always be achieved with the lowest energy input. For this purpose the central unit 100 carries out calculations based on a collected database as well as probabilities in order to determine a best possible control specification. Use is made for example the data of the physical parameters in the building, the information about the located position of the building user, input data which can be supplied to the control system via the user interface, but also weather data and predictions from central information sources from the internet.

In a further advantageous embodiment of the control system for HVAC, central weather information from providers from the internet is utilized in order to optimize the control. Nowadays several HVAC systems already use external temperature sensors in order to adjust HVAC systems on the basis of the weather. An external temperature sensor is no longer necessary when online weather data are used. Moreover, predictive data, such as weather forecasts, can refine the control of the HVAC system. A further advantage of online weather data is that the sunlight and rain can also be taken into consideration in the calculation algorithm of the central unit 100 for control of the HVAC systems. In particular in houses with a large window area sunlight has a great effect on the temperature in the building.

It should be mentioned for example that the control system according to the invention can predict very precisely with the aid of the weather data and forecasts when the building will be heated up by the sun during the morning hours and therefore less heating power will be required. Accordingly when sunshine is forecast a regulation specification/control specification can provide less heating power for the morning, whereas conventional systems cannot take these effects into consideration.

In the event of correlations between different measurement and weather data, such as internal and external temperature, sunlight, cloud conditions, applied heating or cooling power, a profile can be determined which is characteristic for the building or building section and contains information about the heating and cooling sequences under different environmental conditions. This profile is detected over time and is used by the control system in the determination of a regulation specification.

The sensor components 300A-D of the control system according to the invention are suitable for detecting energy or power consumption information of the building G or the individual sections of the building G1, G2, G3 and transferring said information to the central unit 100. The sensor components 300A-D can have a smart electricity meter or gas meter or can be coupled to a smart electricity or gas meter. Alternatively and in addition to the sensor components 300A-D an interface to a data server UDW of an energy supplier (utility data warehouse) is provided which also logs consumption information in a sufficiently precise and up to date manner and supplies this via a data interface on the internet.

From the power consumption information of a building G or a building section G1, G2, G3 an up to date mode of use of the building G or room/building section are determined and utilized for the control system according to the invention. When the residents of a building/room evening goes to bed in the evening, the lights and under certain circumstances the television are switched off. These actions can be read off from the current consumption and can be used by the control system according to the invention in order to adjust a temperature downwards to a lower night-time temperature on the basis of such a result of analysis. Thus modes of behavior and statuses of the building users (for example sleeping, presence, absence, physical activity, watching television, working at desk, cooking) are also derived from the power consumption data (e.g. smart meter data).

The power consumption data are evaluated by the central unit 100 so that certain user statuses can be derived therefrom. It should be mentioned for example that a current consumption profile has specific characteristics when persons in a household go to bed in the evening, since then lights and entertainment electronics are switched off. The reverse applies when the persons get up in the morning. Also the basic presence of persons can be ascertained with a certain probability from such characteristics, since there is a high probability that while a building user is present in the building he will use electrical appliances.

It can also be seen from FIG. 2 how regulation of an individual room or regulation of a building section can be implemented by the control system according to the invention. These may be necessary if for example no distributed interface unit 210A can be coupled to the central energy conversion device H or a higher room-specific comfortable temperature is required. In a such configuration the units 210B-C are preferably directly connected to the heat exchangers W (for example heater/radiator) in the building/room connected and regulate them individually. Such an embodiment with a plurality of individually regulated/controlled building sections can for example be configured so that a thermostat which can be regulated by an adjustment motor is connected to each heater. As can be seen from FIG. 2, in the case of regulation of an individual room an additionally coupling of the control system according to the invention to the central energy conversion device H is also possible.

For building technology components which are associated with a heat exchanger W or the pipe system R, in an advantageous embodiment of the power supply a limited amount of energy can be transported continuously by means of the heating pipes to the sub-systems. There this limited amount of energy can be stored temporarily in an energy accumulator or can be used directly. For this purpose at a location in the building G an energy supply device 1W may be provided, which is itself connected to the power supply system, and introduces an amount of energy in the form of a frequency into the pipe system. The principle of the so-called "single we transmission line", which renders a "ground" conductor unnecessary, was already demonstrated in the 19th century by Nikola Tesla. For this a high-frequency signal is sent by means of a single conductor which is converted by a consumer unit into electrical power. The advantage of this embodiment in connection with a building technology control system for a heating system is based on the fact that no additional electrical conductor has to be laid to the individual heaters, no battery change is necessary and expensive energy harvester modules can be omitted. This is advantageous in particular when, as in the case of heater thermostats operated by adjusting motors, building technology components are fitted directly on the heat exchanger W, such as for instance a heater.

Figure 3:
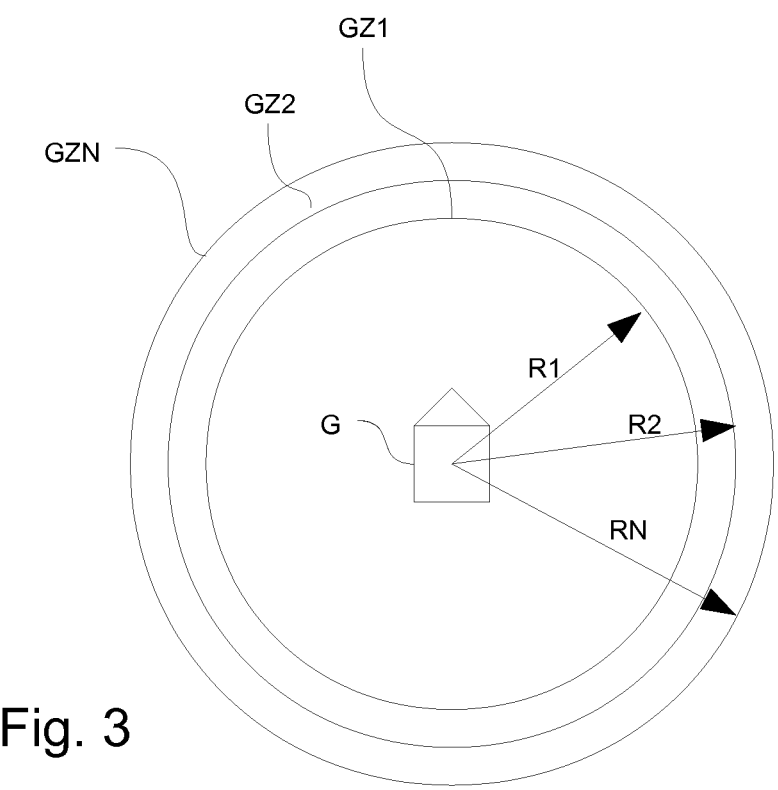
FIG. 3 shows a geozone plan around a building which is equipped with the building technology control system of FIG. 1 and/or FIG. 2.

FIG. 3 serves to illustrate various geozone plans, such as may be used by the control system according to the invention in order to control a building technology component, such as for example a HVAC system in a targeted manner. In a simplest configuration a geozone G1 is defined around a building G inside which a building user may be regarded by the control system according to the invention as "at home" and the system uses a control specification applicable to this building user status. Thus, using the example of a HVAC system, it is operated at a higher output when the building user is "at home", and when the building user is "absent", that is to say outside the geozone 1, at a lower output.

According to a further embodiment to be able a plurality of different geozones R1-RN can be defined by which an even better adapted control a building technology component is made possible. Using the example of a HVAC system, the service of the HVAC system can be for example continuously increased by a correspondingly control specification of the control system when a building user has moved from an external geozone RN into a geozone RN−1 located further in. Thus it is also possible to recognize whether the building user is approaching the building or distant from it. Optionally a geozone can be adjusted individually to the user and his typical behavior in order to achieve optimal control of a building technology component. The control system according to the invention preferably adapts the radii R1-N based upon historical empirical values concerning the previous performance of a building technology component and the time required for a building user to return, so that an inertia inherent in the building technology component can be compensated for by timely starting with a suitable output, and the building technology component has reached a target specification when the building user arrives home. Using the example of a HVAC system, such a target specification may be a room temperature.

LIST OF REFERENCE SIGNS 1 building technology control system
100 central unit of the control system
110 processor device
120 user status determination device
130 internet data interface
140 data storage device
150 communication device
160 power supply device
170 user interface
180 statistical evaluation device
190 user profile storage and management device
200 building technology component of the control system
210 distributed interface unit
211 processor device
212 power supply device
213 sensor
214 communication device
215 user interface
216 actuator
220 building technology functional unit
300 sensor component of the control system
310 distributed interface unit
311 processor device
312 power supply device
313 sensor
314 communication device
315 user interface
200A-D building technology components of the control system
210A-D distributed interface units of the control system
300A-D sensor components of the control system
400 gateway component of the control system
G building
G1-3 building sections
H central energy conversion device of the HVAC system in the building
W decentralized heat exchanger of the HVAC system
E energy storage device
R heat transport pipe line for the HVAC system
M mobile communication device of a building user
IED internet-enabled device
UDW energy supplier database (utility data warehouse)
GDA GPS data transmission
DA data link/exchange
MK mobile communication network
T conventional (originally installed) control/regulating unit or thermostat 1W "1-wire" energy supply device
GZ-N geozones
R1-N radii of the geozones around a building

The invention claimed is:

1. A building technology control system comprising:
at least one interface unit configured to functionally couple to a building technology functional unit; and
a user status determination device configured to communicate with the at least one interface unit and designed to (i) determine a current central electrical energy consumption of a building or building section having multiple electrical devices, wherein the determined current central electrical energy consumption corresponds to the total current electrical energy consumed by the multiple energy-consuming devices, and (ii) derive a current building user status from at least the current central electrical energy consumption, wherein:
the user status determination device is configured to find patterns in the current central electrical energy consumption of the building or building section, which patterns are characteristic of different electrical devices;
the user status determination device is configured to (i) determine, from the patterns in the current central electrical energy consumption, which of the multiple electrical devices are currently activated and (ii) derive the current building user status depending on which electrical devices are determined to be currently activated;
the current building user status indicates whether or not a building user is currently active in the building;
the building technology control system is configured to (i) determine a control specification for the building technology functional unit based on the determined current building user status and (ii) use the control specification for the building technology functional unit to control operation of the building technology functional unit via the at least one interface unit; and
the user status determination device is configured to control the building technology functional unit as a function of which of the multiple electrical devices are identified in the current central electrical energy consumption as being currently activated.

2. The building technology control system according to claim 1, in which the user status determination device comprises one or more of (i) a building user geodata sensing device, (ii) an appliance usage sensing device, (iii) a radio frequency monitoring device, and (iv) a power consumption sensing device which can be coupled to a smart meter.

3. The building technology control system according to claim 2, further comprising one or both of (i) a statistical evaluation device and (ii) a user profile storage and management device which, from a determined previous building user status determined by the user status determination device, derive a user behavior profile which is typical for a corresponding building user and which is used exclusively or in co-ordination with the determined current building user status for controlling the operation of the building technology functional unit.

4. The building technology control system according to claim 2, in which the building user geodata sensing device of the user status determination device is designed to determine, by comparison of a geodata set of a corresponding building and a geodata set of a corresponding building user, whether or not the building user is located within a defined geozone around the building.

5. The building technology control system according to claim 2, in which the appliance usage sensing device of the user status determination device is designed to determine, by coupling to a software application of a corresponding building user, whether a corresponding computer is being used.

6. The building technology control system according to claim 2, wherein the radio frequency monitoring device of the user status determination device is designed to determine the presence of a corresponding building user in a corresponding building by monitoring radio frequency bands for specific characteristics that are typical emission characteristics of one or more of a portable mobile communication device, a WLAN/WiFi module, and a Bluetooth module.

7. The building technology control system according to claim 2, wherein the power consumption sensing device of the user status determination device is designed to determine from a measured current consumption which electrical consumer unit in a corresponding building or of a corresponding building user is being used, wherein a conclusion can be drawn as to the determined current building user status from the electrical consumer unit determined being used.

8. The building technology control system according to claim 1, wherein the building technology functional unit is one or more of an energy-generating system and an energy storage unit.

9. The building technology control system according to claim 1, wherein the user determination device is configured to (i) determine from the current central electrical energy consumption whether or not a television is turned on and (ii) derive the current building user status from at least the information whether or not the television is turned on.

10. The building technology control system according to claim 1, wherein the building technology control system is configured to determine the current central electrical energy consumption of the building or building section having the multiple electrical devices using a single power consumption sensing device without independently monitoring the electrical consumption of individual electrical devices.

11. The building technology control system according to claim 1, wherein:
the user status determination device is configured to distinguish, from patterns in the current central electrical energy consumption, between (i) an activated television and (ii) an activated washing machine or activated refrigerator;
the user status determination device is configured to set different current building user statuses depending on whether or not a television is found to be currently activated;
the user status determination device is configured to adjust a setting of the building technology functional unit if the user status determination device identifies, based on the current central electrical energy consumption, that the television is switched on or off; and
the user status determination device is configured not to adjust the setting of the building technology functional unit if the user status determination device identifies, based on the current central electrical energy consumption, that the refrigerator is switched on or off.

12. The building technology control system according to claim 1, wherein:
the building technology functional unit comprises a heating, ventilation, and air conditioning system;
the user status determination device is configured to distinguish, from patterns in the current central electrical energy consumption, between (i) an activated television and (ii) an activated washing machine or activated refrigerator;

the user status determination device is configured to set different current building user statuses, depending on whether or not a television is found to be currently activated, for setting different temperatures with the heating, ventilation, and air conditioning system in dependence on whether or not a television is found to be currently activated;

the user status determination device is configured to adjust a setting of the heating, ventilation, and air conditioning system if the user status determination device identifies, based on the current central electrical energy consumption, that the television is switched on or off; and the user status determination device is configured not to adjust the setting of the heating, ventilation, and air conditioning system if the user status determination device identifies, based on the current central electrical energy consumption, that the refrigerator is switched on or off.

13. A method for controlling a building technology functional unit by a building technology control system, the building technology control system comprising (i) at least one interface unit that functionally couples to the building technology functional unit and (ii) a user status determination device that communicates with the at least one interface unit, the method comprising:

(a) the user status determination device determining a current central electrical energy consumption of a building or building section having multiple electrical devices;

(b) the user status determination device deriving, from at least the current central electrical energy consumption, a current building user status indicating whether or not a building user is currently active in the building by (i) the user status determination device finding patterns in the current central electrical energy consumption of the building or building section having multiple electrical devices, wherein the determined current central electrical energy consumption corresponds to the total current electrical energy consumed by the multiple electrical devices, which patterns are characteristic of different electrical devices, (ii) the user status determination device determining from the patterns in the current central electrical energy consumption which of the multiple electrical devices are currently activated, and (iii) the user status determination device deriving the current building user status depending on which electrical devices are determined to be currently activated; and (c) the building technology control system using the determined current building user status to determine a control specification for a building technology functional unit, wherein:

the building technology control system uses the control specification for the building technology functional unit to control operation of the building functional unit via the at least one interface unit; and the user status determination device of the building technology control system controls the building technology functional unit as a function of which of the multiple electrical devices are identified in the current central electrical energy consumption as being currently activated.

14. The method according to claim 13, wherein step (a) comprises the determination of an electrical consumer unit currently being operated in a corresponding building by means of current consumption measured in the building, wherein the determined current building user status is determined from the electrical consumer unit currently being operated.

15. The method according to claim 13, wherein:

step (a) comprises determining from the current central electrical energy consumption whether or not a television is turned on; and step (b) comprises deriving the current building user status from at least the information whether or not the television is turned on.

16. The method according to claim 13, wherein step (a) comprises determining the current central electrical energy consumption of the building or building section having the multiple electrical devices using a single power consumption sensing device without independently monitoring the electrical consumption of individual electrical devices.

* * * * *